(12) United States Patent
Mazurek et al.

(10) Patent No.: US 6,776,900 B2
(45) Date of Patent: Aug. 17, 2004

(54) LEVEL MEASUREMENT FOR GREASE SEPARATORS

(75) Inventors: Niel Mazurek, Huntingdon Valley, PA (US); B. Scott Holloway, Mays Landing, NJ (US); Charles Tevis, Marlton, NJ (US)

(73) Assignee: Josam Company, Philadelphia, PA (US)

( * ) Notice: Subject to any disclaimer, the term of this patent is extended or adjusted under 35 U.S.C. 154(b) by 0 days.

(21) Appl. No.: 10/151,325

(22) Filed: May 20, 2002

(65) Prior Publication Data

US 2002/0166803 A1 Nov. 14, 2002

Related U.S. Application Data

(63) Continuation-in-part of application No. 09/627,389, filed on Jul. 28, 2000, now Pat. No. 6,423,213.

(51) Int. Cl.$^7$ .............................. C02F 1/40; G01N 33/03
(52) U.S. Cl. ......................... 210/115; 210/86; 210/143; 340/620; 361/284; 73/304 C
(58) Field of Search .................... 210/86, 97, 115, 210/149, 538, 540, 143, DIG. 8; 417/32; 340/620; 73/304 R, 304 C; 137/392; 361/284

(56) References Cited

U.S. PATENT DOCUMENTS

| 5,705,055 A | * | 1/1998 | Holloway et al. | ........... 210/115 |
| 6,318,172 B1 | * | 11/2001 | Byatt et al. | .............. 73/304 C |
| 6,423,213 B1 | * | 7/2002 | Mazurek | ..................... 210/115 |

FOREIGN PATENT DOCUMENTS

JP 09206504 A * 8/1997 ........... B01D/17/02

* cited by examiner

Primary Examiner—Terry K. Cecil
(74) Attorney, Agent, or Firm—Calfee, Halter & Griswold LLP (57) ABSTRACT

An interceptor for removing grease from an effluent stream containing grease and water may be queried remotely to check it status. An output signal indicative of the amount of grease is transmitted over a telephone line to a telephone or computer or other remote station, or wirelessly to a remote receiver. The status is preferably also indicated locally with visual and/or audible signals. The grease depth level sensor is preferably a capacitive level sensor operative to sense the amount of water in the body of effluent thereby to determine the amount of grease in the body of effluent. The interceptor may include electric circuitry for effecting manual or automatic calibration of the sensor. The sensor may be adapted to be retrofitted to an existing tank made from either metal or plastic.

22 Claims, 7 Drawing Sheets

LEVEL MEASUREMENT FOR GREASE SEPARATORS

RELATED APPLICATION

This application is a continuation in part of U.S. patent application Ser. No. 09/627,389, filed Jul. 28, 2000, now U.S. Pat. No. 6,423,213 entitled Continuous Level Measurement For Grease Separator, and this application claims the benefit of the filing date of all common subject matter.

BACKGROUND OF THE INVENTION

The present invention relates to an apparatus for recovering grease from a grease separator. In particular, the present invention relates to a sensor operative for sensing the presence of a thickened layer of grease in a body of effluent.

It is known to pass the effluent from food processing facilities or other operations through devices for removing grease, to enable the grease to be kept out of a sewage system. Some such devices use a sensor for sensing the presence of a thickened layer of grease in the body of effluent in the device. The output of the sensor is then used to control pumping of grease from the device. An example of such a device is the automatic interceptor shown in U.S. Pat. No. 5,705,055, which shows a capacitance level switch located at a specific height in the device. The level switch provides an SPST switch closure to an electric controller to indicate the presence of a certain level of grease and the need to commence pumping of grease.

Some interceptor systems are manual, that is, do not have an automatically actuated pump. Thus, the grease level in the tank increases until it is manually removed. In manual systems, the level of grease contained in a tank can only be determined by physical inspection (i.e., the tank lid must be removed). Scheduled inspections may occur after the tank has already filled and grease has begun to flow into the sewer system, creating a significant problem. Therefore, there is an unmet need for a method of remotely determining the level of grease in the tank.

Another unmet need in the market arises from the fact that there is large variety of existing manual interceptor tank sizes and shapes available from multiple vendors. It would be impractical to design a custom level measurement system for each tank. In addition, not all manual interceptors are constructed of metal, and therefore not all are compatible with level measurement systems designed for metal tanks.

Thus, there is a need for a grease level measurement system with the following characteristics. The level measurement system must operate with the large majority of existing manual interceptor products. The level measurement system must be able to be retrofitted in the field on the large majority of installed manual interceptor products. The level measurement system would provide a local visual indication of the grease level and a local alarm when the grease interceptor tank requires servicing. The level measurement system would provide for remote monitoring of the grease level and a remote alarm when the grease interceptor tank requires servicing.

SUMMARY OF THE INVENTION

The present invention relates to apparatus for removing grease from an effluent stream containing grease and water. A separation tank defines a separation chamber. An effluent inlet connected with the separation tank permits flow of the effluent stream into the chamber to form a body of effluent in the separation chamber. A grease depth level sensor is used in determining the amount of grease in the body of effluent.

The interceptor may be queried remotely to check its status. In one embodiment, an output signal indicative of the amount of grease is transmitted over a telephone line to a telephone or computer or other remote station. Alternatively, the output signal is transmitted wirelessly to a remote receiver. The status is preferably also indicated locally with visual and/or audible signals.

The sensor is preferably a capacitive level sensor operative to sense the amount of water in the body of effluent thereby to determine the amount of grease in the body of effluent. The interceptor may include electric circuitry for effecting manual or automatic calibration of the grease depth level sensor. The sensor may be adapted to be retrofitted to an existing tank made from either metal or plastic.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

The present invention relates to apparatus for separating grease from effluent containing grease and water. The present invention is applicable to grease separators (interceptors) of various constructions, as shown and otherwise. As representative of the present invention, FIGS. 1–4 illustrate an interceptor 10 in accordance with a first embodiment of the invention. The interceptor 10 includes a separation tank 12 and a trap leg 14. An equipment cabinet 16 is connected to the separation tank 12.

Figure 2:
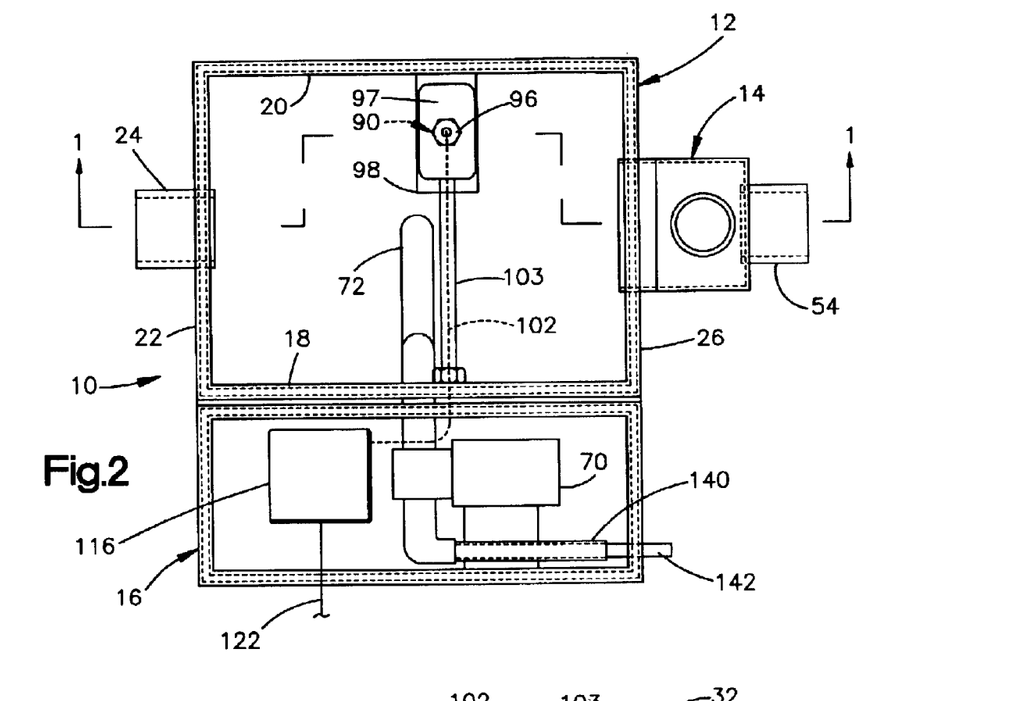
FIG. 2 is a top plan view of the interceptor of FIG. 1, taken generally along line 2—2 of FIG. 1.
Figure 3:
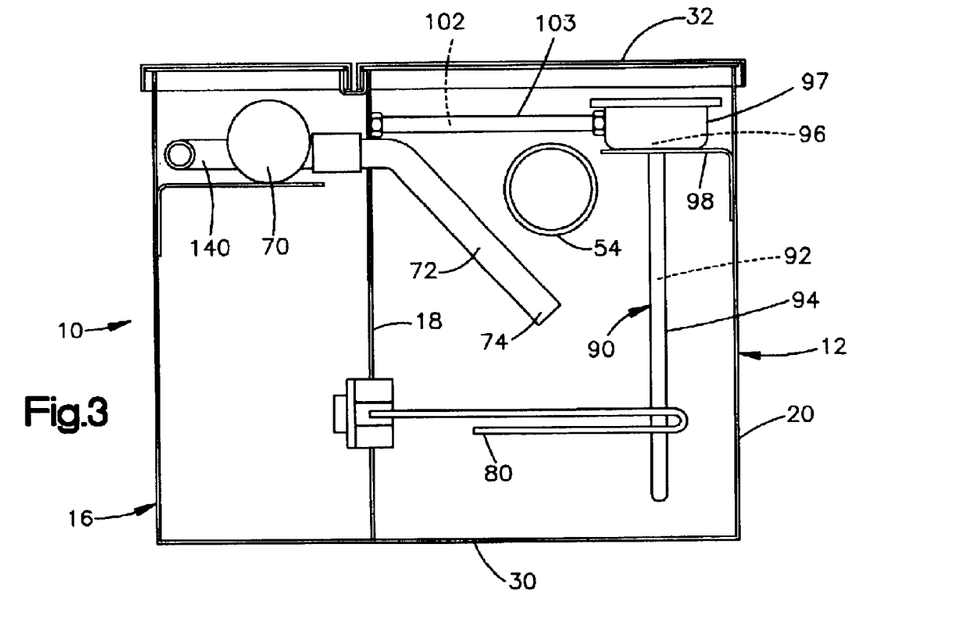
FIG. 3 is an end view of the interceptor, taken generally along line 3—3 of FIG. 1.

The separation tank 12 is made from an electrically conductive material, such as metal, and includes a front wall 18 (FIG. 2) and an opposite back wall 20. An inlet wall 22 interconnects the front and back walls 18 and 20. An inlet 24 extends through the inlet wall 22. At its opposite end the separation tank 12 includes an end wall 26 (FIG. 2). The end wall 26 has a rectangular opening 28 into the trap leg 14.

The separation tank 12 also has a bottom wall 30 and a removable cover 32. Together, the walls 18, 20, 22, 26 and 30, and the cover 32, define a separation chamber 40 in the separation tank 12.

The trap leg 14 is a vertically extending rectangular tube, which is spaced from the separation tank 12. An open tubular portion 42 of the trap leg 14 is welded to the separation tank 12. An open space 44 extends between the separation tank 12 and the trap leg 14 at other locations. The opening 28 in the separation tank wall 26 is aligned with an opening 46 in the tubular portion 42 of the trap leg 14, and together they define an intermediate passage 48 between the separation tank 12 and the trap leg 14. The intermediate passage 48 is disposed below the inlet 24.

An outlet wall 50 of the trap leg 14 is spaced from and extends generally parallel to the wall 26. The walls of the trap leg 14 define a water chamber 52 in the trap leg. An outlet 54 extends from the water chamber 52 in the trap leg 14 and has a lower edge 56. The lower edge 56 defines a static fluid level 60 which is the same in both the separation tank 12 and the trap leg 14. Water flowing out of the interceptor 10 from the outlet 54 is drained through suitable piping or other means (not shown) into a drain or sewer system.

The separation tank 12 includes an inlet baffle 62 and two lower baffles 64 and 66. Effluent flows upward through the spaces between the parallel baffles 62□66. A smaller amount of the effluent flows beneath the lower end of the baffle 66. The baffles 62□66 cooperate to produce an upward flow of effluent in the separation tank 12 in a direction away from the intermediate passage 48. The upward flow of effluent induces separation by specific gravity of the components of the effluent entering the separation tank 12 with the less dense components, such as grease, floating on top of the denser components, such as water.

The equipment cabinet 16 is connected with the front wall 18 of the separation tank 12 in a manner so as to provide a dry environment for the equipment therein. Depending on installation requirements, an optional removable top cover may be provided for top access to the equipment cabinet 16. An electrically actuated pump 70 is disposed in the equipment cabinet 16. A suction conduit 72 extends from the pump 70 through the separation tank front wall 18 into the separation tank 12. The suction conduit 72 has an inlet end portion 74 disposed above the upper edge of the intermediate passage 48.

A heater 80 extends from the separation tank front wall 18 into the separation tank 12. The heater 80 is disposed below the inlet end 74 of the pump suction conduit 72 and is preferably an electrical resistance heater. The heater 80 is selectively supplied with electric current to energize the heater to heat the effluent within which the heaters are disposed. The heater 80 is operable to heat the effluent to a temperature greater than the temperature at which the grease in the effluent solidifies. It should be understood that heaters of a type other than electrical resistance heaters may be used.

In the separation tank 12, the grease separates from the water in the effluent. Since the grease is lighter than the water, the grease floats on the water. This results in the liquid in the separation tank 12 constituting a layer of grease 130 floating on a body of water 132. The thickness of the layer of grease 130, that is, the depth of the grease, is measured downward from the upper surface of the effluent in the separation tank 12 (the static level 60) to a boundary 134 between the body of grease in the upper portion of the separation tank and the body of water in a lower portion of the separation tank.

The interceptor 10 includes a grease depth signal probe 90 for measuring the thickness of the layer of grease 130. The probe 90 includes a first or inner portion 92 and a second or outer portion 94. The inner portion 92 of the probe 90 is an electrically conductive member. In the illustrated embodiment, the inner portion 92 of the probe 90 is a stainless steel rod.

The outer portion 94 of the probe 90 is an electrically non-conductive, or insulating, member. In the illustrated embodiment, the outer portion 94 of the probe 90 is a plastic sleeve on the rod 92. The plastic sleeve 94 may be made from, for example, Teflon brand plastic.

The probe 90 is an insulated conductive probe extending generally vertically in the separation tank 12 from a location above the upper surface of the effluent in the tank to a location near the bottom of the tank. The probe 90 is supported, via a coupling 96 in a water-proof container 97, and by a bracket 98, on the back wall 20 of the separation tank 12. The probe 90 extends downward in the separation tank 12. The probe 90 is spaced apart by a substantial distance from all the side walls of the separation tank 12.

An upper or outer end portion 100 of the rod 92 extends through the coupling 96. The upper end portion 100 of the rod 92 is electrically connected, via lead wires shown schematically at 102 extending through a conduit 103, with electric circuitry indicated schematically at 110. In addition, the tank wall 18, which is made from metal, is also electrically connected, via lead wires shown schematically at 104, with the electric circuitry 110.

The electric circuitry 110 measures the capacitance between the probe 90 and the tank wall 18, through any body of water between them. The capacitance between the probe 90 and the tank wall 18 is a function of the water level (amount of water) in the separation tank 12. The portion of the probe 90 covered by grease, or in air, contributes very little to the measured capacitance value.

Figure 4:
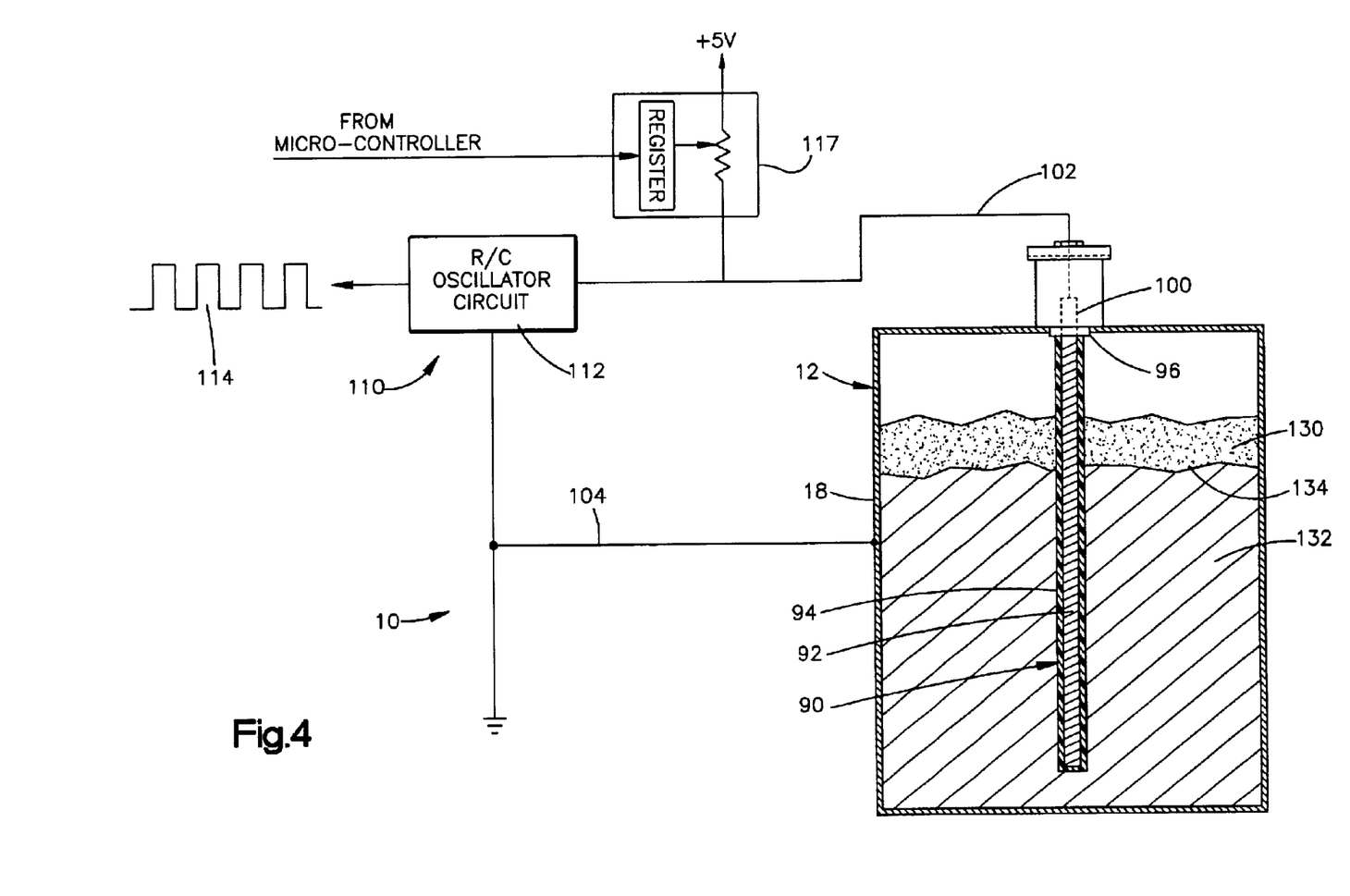
FIG. 4 is a schematic side view of the interceptor and also showing electrical components for automatically calibrating and for controlling operation of the interceptor.

The electric circuitry 110 includes an electronic oscillator circuit 112 (FIG. 4). The electronic oscillator circuit 112 in the illustrated embodiment includes a Resistor/Capacitor (R/C) oscillator integrated circuit device. The lead wires 102 and 104, from the probe 90 and the tank wall 18, respectively, are connected with the R/C circuit 112. The output of the circuit 112 is a square wave 114 whose frequency is proportional to the product of the R/C values.

The electric circuitry 110 also includes a controller 116 (FIG. 2). The controller 116 preferably includes one or more microprocessors for controlling operation of the interceptor 10 and, specifically, the pump 70. The controller 116 may, for example, be a plurality of discrete components and/or a combination of discrete components and integrated circuits. In one example, the controller 116 is a microcomputer or microprocessor which receives sensory input from one or more sources, such as the probe 90, and, using the sensory input, makes determinations for control of the pump 70.

The controller 116 also contains a frequency counter function. The microprocessor in the controller is programmed to determine the frequency of the square wave signal 114 received from the oscillator circuit 112. The circuitry 110 also includes a digitally controllable potentiometer (EEPOT) 117 (FIG. 4) that receives serial data from the controller. Examples include those made by XICOR (X93XX series) and Analog Devices (AD5200 series.)

The electric circuitry 110 is calibrated as follows. Two level marks (not shown), typically about four inches apart, are scribed on the separation tank at known heights. The tank 12 is filled with water to the lower scribe mark, which is the desired maximum grease depth level. The controller 116 adjusts the potentiometer 117 until the controller has captured an acceptable frequency for the maximum grease level. The calibration routine programmed into the controller 116 records the frequency of the oscillator circuit 112 at that water level.

The separation tank 12 is then filled with water to the upper scribe mark, which is the desired minimum grease depth level. The controller captures an acceptable frequency for the minimum grease level. The calibration routine programmed into the controller 116 records the frequency of the oscillator circuit at that water level 112.

The calibration points are stored in non-volatile memory in the controller 116. The software in the microprocessor uses these two calibration points to scale between the two points to develop an equation of frequency versus water level. This equation is valid for substantially all points along the length of the probe 90. Thus, the circuitry 110 is capable of continuously measuring the capacitance between the probe 90 and the tank wall 18, and of providing a continuous level reading in return, for all points between maximum and minimum grease levels.

Figure 1:
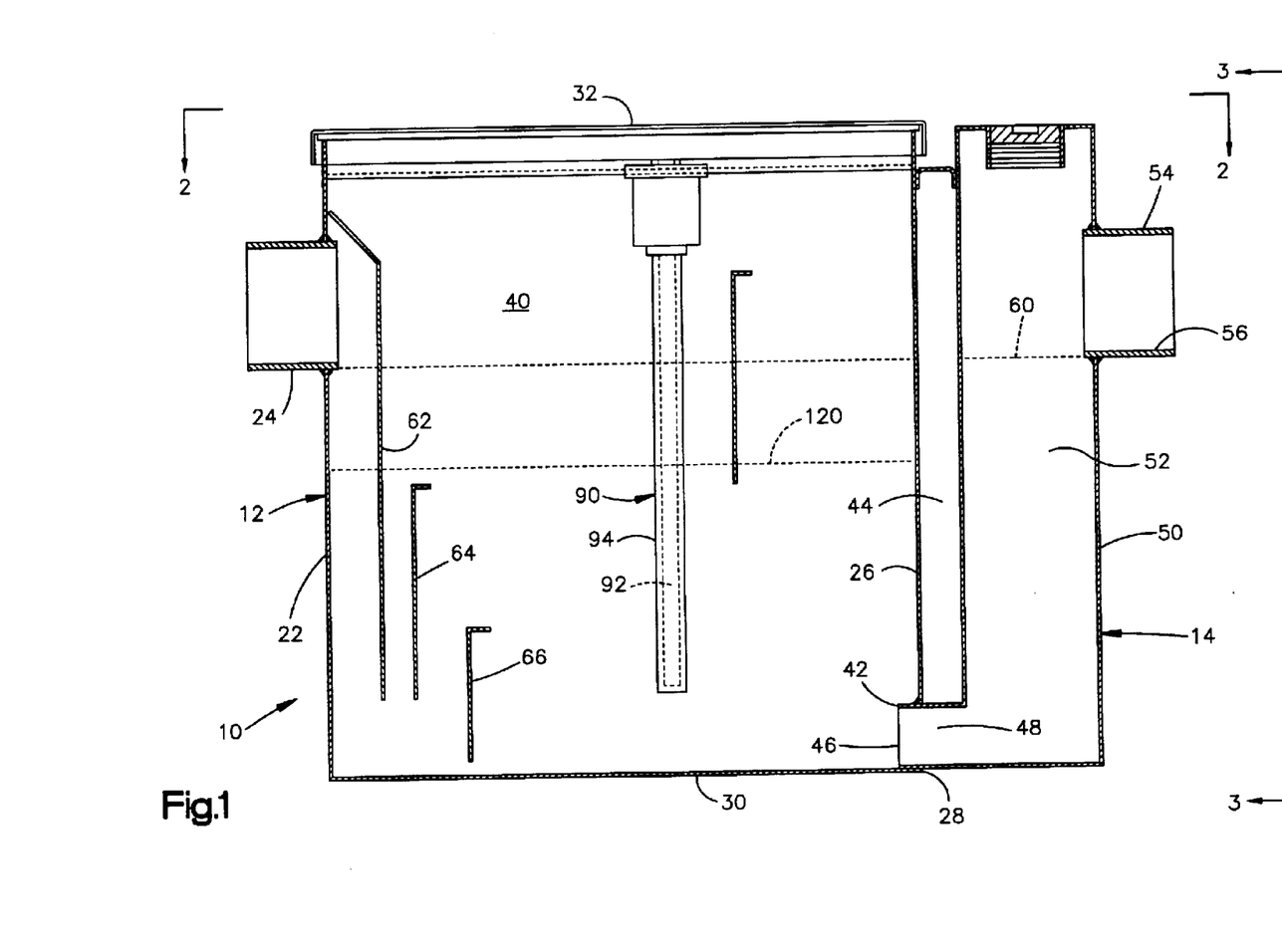
FIG. 1 is a side elevational view of an interceptor constructed in accordance with the present invention and including a separator tank.

The interceptor 10 is programmed to start the pumping cycle of the pump 70 when a predetermined grease layer depth, indicated in FIG. 1 by the line 120, is reached. The probe 90 extends well below the predetermined depth 120.

The controller 110 is electrically connected also with the heater 80 and 122. The controller 116 controls the operation of the heater 80 and the pump 70 in response to signals received from sensors including the grease depth signal probe 90. The controller 116 and the other electrically operated components of the interceptor 10 are supplied with electric current through an electrical wiring harness 122.

To prevent outflow of grease during initial setup of the interceptor 10, the interceptor 10 is initially filled with clean water, that is, water not having any significant grease content. Clean water is supplied through the inlet 22. As more water enters through the inlet 22, the separation tank 12 fills with water. As the separation tank 12 fills, water also flows from the separation tank through the intermediate passage 48 into the trap leg 14. The upper surface of the body of water in the trap leg 14 is at the same level as the upper surface of the body of water in the separation tank 12. The two bodies of liquid, which are interconnected through the intermediate passage 48, form one continuous body of liquid.

As more water enters through the inlet 22, the level of water in the separation tank 12 continues to rise. As the water level rises, the grease depth level probe 90 is at least partially submerged. The upper surface of the water in the separation tank 12 rises until it reaches the lower edge 56 of the interceptor outlet 54 in the trap leg 14. The water begins to flow out of the interceptor 10. The interceptor 10 is, at this point, filled with clean water, in both the separation tank 12 and the trap leg 14. The two bodies of liquid have the same level, which is the static level 60.

The effluent which is to be cleaned is then allowed to flow into the interceptor 10 through the inlet 22. The effluent flowing into the separation tank 12 mixes with the water already in the separation tank 12. The grease component of the effluent in the separation tank 12 floats to the top of the body of liquid in the separation tank. This forms what is initially a thin layer of grease 130 on top of a relatively thick layer of water 132. The grease 130 forms at least a portion of the upper surface of the effluent in the separation tank 12. The boundary 134 between this layer of grease 130 and the layer of water 132 is disposed above the upper edge of the intermediate passage 48. Thus, the grease remains in the separation tank 12 and does not flow into the trap leg 14.

As the effluent flows into the separation tank 12 through the inlet 22, the total volume of liquid in the separation tank increases. This tends to raise the level of the upper surface of the bodies of liquid in the separation tank 12 and in the trap leg 14 to a level above the static level 60. This causes a volume of liquid to flow out of the trap leg 14 through the interceptor outlet 54. The liquid which flows out of the trap leg 14 through the interceptor outlet 54 is clean water, because no grease has entered the trap leg. Simultaneously, an identical volume of liquid flows from the separation tank 12 through the intermediate passage 48 and into the trap leg 14. The liquid which flows from the separation tank 12 through the intermediate passage 48 and into the trap leg 14 is also clean water, because the boundary 134 between the grease layer 130 and the water layer 132 is above the intermediate passage.

As more effluent flows into the separation tank 12, the thickness of the grease layer 130 in the separation tank 12 increases. That is, the depth of the grease layer 130 as measured downward from the upper surface 60 of the body of fluid in the separation tank 12 increases. The boundary 134 between the layer of grease 130 and the layer of water 132 moves downward, away from the static level 60 in a direction toward the predetermined grease depth.

The grease and water separation process is preferably a continuous process, rather than a batch process. Thus, while the inlet 22 is open to enable flow of effluent into the separation tank 12, grease 130 and water 132 in the effluent separate within the separation tank 12; water flows from the separation tank into the trap leg 14; and water flows out of the trap leg and thus out of the interceptor 10 from the outlet 54. While the inlet 22 and the outlet 54 have the same surface area, the intermediate passage 48 is larger in surface area to allow this continuous flow.

As more grease collects in the separation tank 12, the depth of the layer of grease 130 increases. Simultaneously, the amount of water 132 in the separation tank 12 decreases. Thus, the boundary 134 between the grease layer 130 and the water layer 132 in the separation tank 12 moves downward toward the predetermined grease depth level 120.

As the amount of water 132 in the separation tank 12 decreases, the capacitance between the probe 90 and the tank wall 18 decreases continuously. This decrease in capacitance is sensed by the circuitry 110 and noted in the controller 116. The controller 116 compares the sensed capacitance with the values stored in its memory, and on the basis of that comparison, determines whether the amount of grease in the separation tank 12 is sufficient to start the pumping cycle of the interceptor 10.

When the controller 116 senses, by this capacitance measurement, that predetermined grease depth level 120 is reached, the controller actuates an electric alarm. The alarm signals the operator to stop the flow of effluent into the interceptor 10. After a predetermined period of time, the heater 80 is actuated to heat the body of liquid in the separation tank 12. The heater 80 heats the water layer 132 of the body of liquid in the separation tank 12.

As the water 132 is heated, so also the layer of grease 130 on top of the water is heated, and the grease is liquefied so that it can be pumped out by the pump 70. When a temperature sensor senses that the temperature of the layer of grease 130 is such that the grease is liquefied, i.e., at about 140° F., the temperature sensor signals the controller 116 to turn off the heater 80. Another alarm is also sounded, to indicate the beginning of the pumping process.

The pump 70 is then turned on in response to a signal from the controller 116. Grease is pumped out of the separation tank 12 of the interceptor 10. The grease is suctioned into the pump inlet 74 and through the suction conduit 72 to the pump 70. The grease is then pumped through a conduit 140 and a pump outlet 142, and exits the interceptor 10. The grease is then stored or transported elsewhere in an appropriate manner.

During the time period when grease is being pumped out of the separation tank 12, the upper surface of the body of liquid in the separation tank 12 falls. This is because no effluent is entering the separation tank 12. The upper surface of the body of water in the trap leg 14 also drops as water therefrom flows back into the separation tank 12.

The pump 70 remains actuated for a predetermined period of time. This predetermined period of time is selected to be long enough to pump all or substantially all of the grease layer 130 out of the separation tank 12. When the predetermined period of time expires, the controller 116 turns off the pump 70 to interrupt pumping of grease from the interceptor 10.

The controller 116 also actuates a suitable visual or audible signal so that the operator can resume the flow of effluent through the inlet 22. The level of effluent in the separation tank 12 and the trap leg 16 again rises. As the level of liquid in the separation tank 12 increases, the grease depth level probe 90 is submerged with clear water. When sufficient clear water is surrounding the probe 90, the capacitance between the probe and the tank wall 18 increases to a point at which the controller 116 resets its operative cycle.

The interceptor 10 may also be operated by allowing some effluent to continue to flow into the separation tank 12 through the inlet 22 while grease is being heated by the heater 80 and then pumped out by the pump 70. In this case, because effluent continues to flow into the separation tank 12 while grease is being heated, the heating portion of the cycle takes longer than if the inlet flow is stopped during the cycle.

The grease depth level probe 90 acts as a continuous level sensor—that is, it provides continuously a signal indicative of the capacitance between the probe 90 and the tank wall 18. As the water/grease level in the separation tank 12 varies, the capacitance varies. The water level is indicative of the thickness of the grease layer 130. So, the circuitry 110 provides a continuous reading of the thickness of the layer of grease 130.

Over an extended period of time, grease may tend to coagulate on the internal parts of the interceptor 10. If the interceptor 10 were to sense grease depth only at a single vertical point in the separation tank 12 (by sensing the presence or absence of water at that one level), then a buildup of grease at the single-point sensor could cause erratic or incorrect readings and operation of the interceptor. For example, such a sensor might always indicate the presence of grease, not water. Alternatively, grease buildup might trap a small amount of water so that the sensor might always indicate the presence of water, not grease.

With the interceptor 10 of the present invention, however, coagulated grease around one portion of the probe 90 has minimal effect on the measured water level, because the probe is sensing the presence or absence of water along its entire length. In addition, changes over time, resulting from buildup of grease or scum on the probe 90, can be compensated for by software at the controller 116 without need for recalibration at the tank level.

In an alternative embodiment, the interceptor 10 (FIG. 4A) may be calibrated manually. The digitally controllable potentiometer 117 is replaced with a manually adjustable timing resistor 118. The interceptor 10 is calibrated as follows.

Figure 4A:
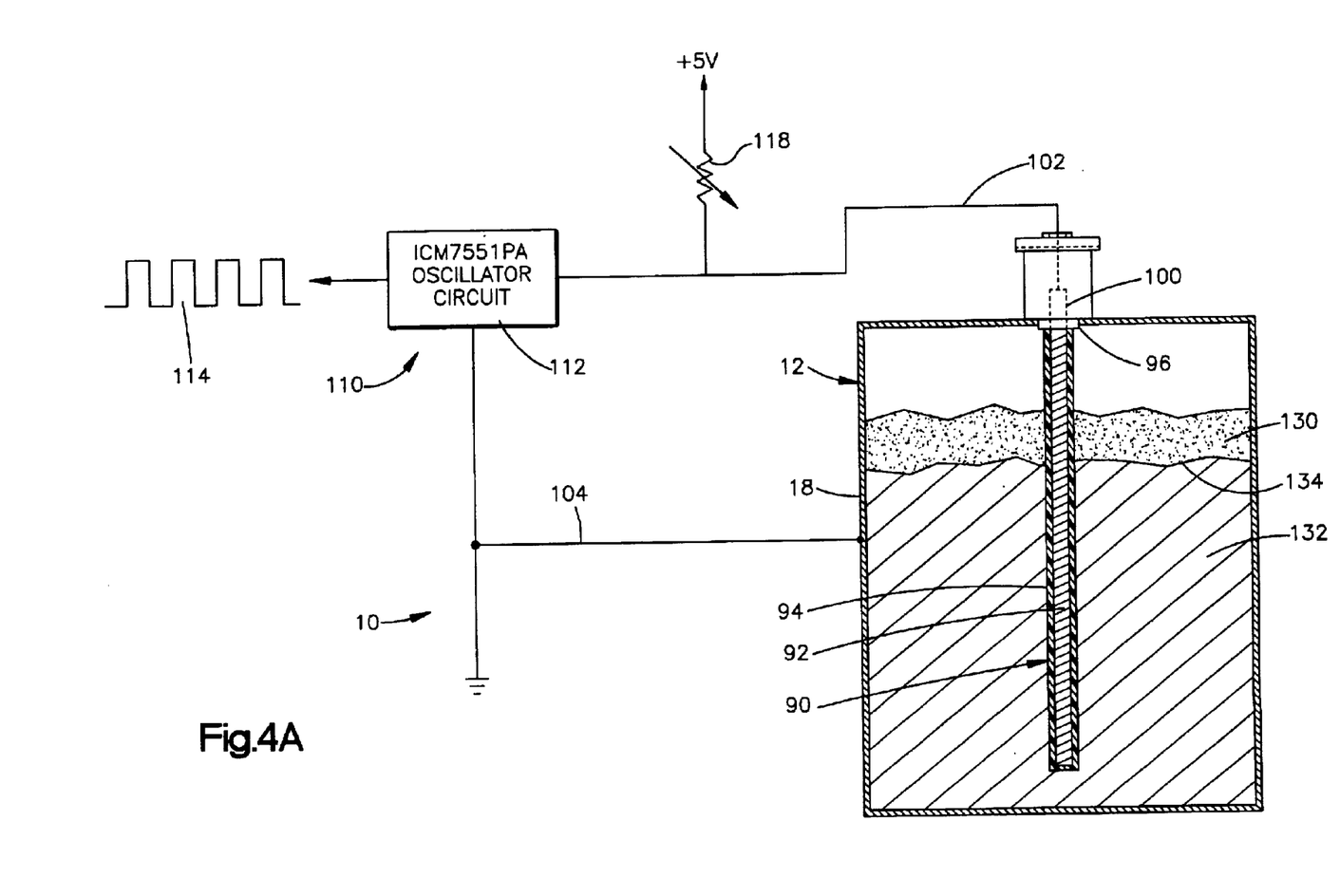
FIG. 4A is a view similar to FIG. 4 showing electrical components for manually calibrating the interceptor.

Two level marks (not shown), typically about four inches apart, are scribed on the separation tank at known heights. The tank 12 is filled with water to the lower scribe mark, which is the desired maximum grease depth level. The operator manually adjusts the variable resistor 118 until the controller provides a visual indication that it has captured the frequency of the maximum grease level. The calibration routine programmed into the controller 116 records the frequency of the oscillator circuit 112 at that water level.

The separation tank 12 is then filled with water to the upper scribe mark, which is the desired minimum grease depth level. The controller provides a visual indication that it has captured the frequency of the minimum grease level. The calibration routine programmed into the controller 116 records the frequency of the oscillator circuit at that water level 112.

The calibration points are stored in non-volatile memory in the controller 116. The software in the microprocessor uses these two calibration points to scale between the two points to develop an equation of frequency versus water level. This equation is valid for substantially all points along the length of the probe 90. Thus, the circuitry 110 is capable of continuously measuring the capacitance between the probe 90 and the tank wall 18, and of providing a continuous level reading in return, for all points between maximum and minimum grease levels.

There is a large number of interceptor tank sizes and shapes on the market. The variation in interceptor tank sizes and shapes creates a wide variety of capacitance ranges for a fixed probe design. The manual method and the automated method of calibration (described above) take into account and handle the variation in manual interceptor tank sizes and shapes while using a fixed probe design.

Figure 5:
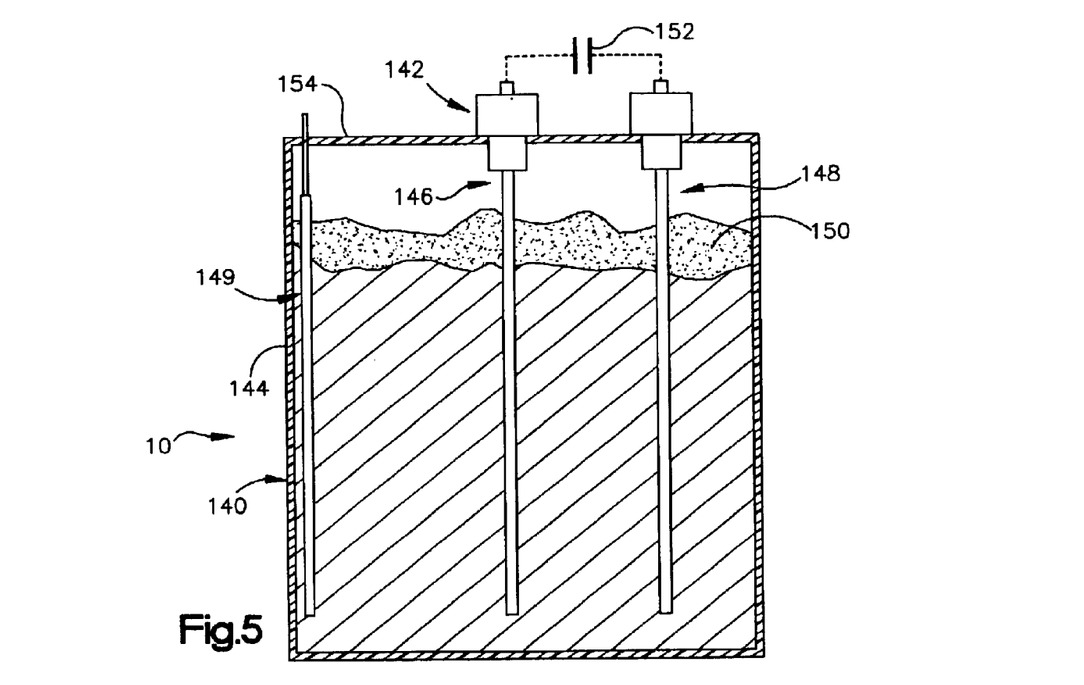
FIG. 5 is a view of an interceptor separator tank and sensor assembly in accordance with a further embodiment of the invention.

FIG. 5 is a view of a different interceptor separator tank 140 and sensor assembly 142 in accordance with a further embodiment of the invention. The interceptor tank 140 is not made of an electrically conductive material, such as metal. Instead, the tank 140 is made from a non-conductive material, such as plastic. As a result, it is not possible to measure capacitance between a conductive probe and the tank wall 144. Therefore, the sensor assembly 142 includes two grease depth signal probes 146 and 148 for helping to determine the thickness of a layer of grease 150 in the tank 140. The two probes 146 and 148 may be identical to each other and may be identical to the probe 90 used in the interceptor 10 (FIGS. 1–4).

To determine when grease needs to be cleaned from the separator tank 140, the capacitance is measured between the first probe 146 and the second probe 148. A measured capacitance value is determined at 152. The capacitance value 152 is used in the same manner as in the first embodiment of the invention, to determine the water level in the tank 140. The water level determination is indicative of the thickness of the grease layer 150, and can be used to determine when the accumulated grease needs to be removed from the separator tank 140. (It should be understood that the effluent inlet and water outlet are not shown in FIG. 5 and would be present in any separator tank used with the present invention, to establish a body of effluent with a grease level whose thickness varies depending on the amount of grease that flows into the tank over a period of time.)

In the assembly, the two probes 146 and 148 are mounted on the top wall or cover 154 of the tank 140. The cover 154 may be removable as shown in FIG. 1. In this regard, the sensor probes 146 and 148 are usable in an add-on or retrofit manner to an existing separator tank. No tank wall connection need be made. The only change to the existing tank is mounting the two vertically extending probes 146 and 148 on the tank cover 154.

The second probe 148 may be insulated with nylon or Teflon, or may be non-insulated. The distance between the two probes 146 and 148 may be in the range of from less than one inch to more than ten inches. The second probe 148 may be mounted on but electrically isolated from the first probe 146. Alternatively, the second probe 148 may be mounted directly to the interceptor tank 140, like the first probe 146, as shown in FIG. 5.

Figure 8:
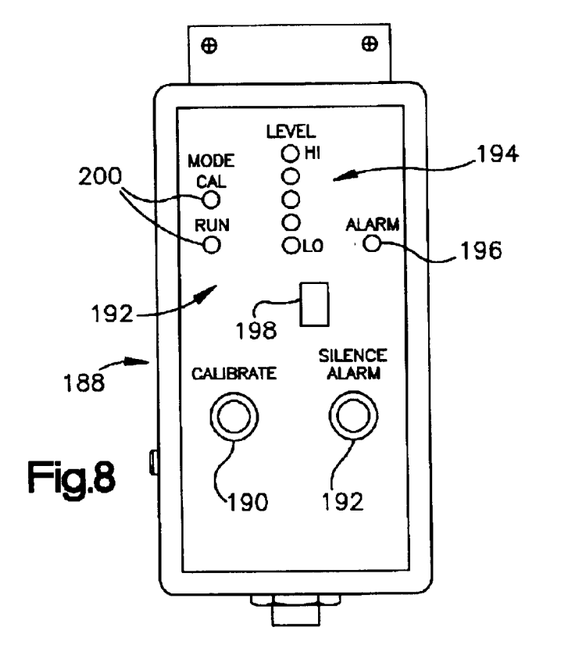
FIG. 8 is a view of a control and alarm panel that can be used in the present invention.
Figure 9:
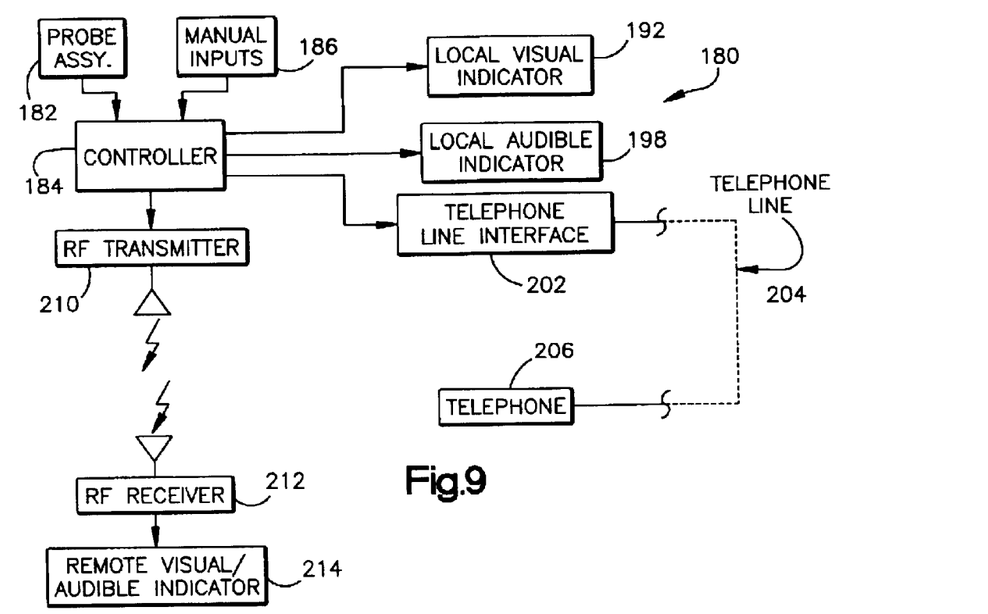
FIG. 9 is a functional block diagram of an interceptor system including an analog remote status check.

In addition, the interceptor shown in FIG. 5 does not include a pump for pumping grease from the tank 140. In this regard, the level determination made with the capacitive sensor probes 146 and 148 is usable in an add-on or retrofit manner to an existing separator tank having no pump. The level determination can be used to produce an audible or visible alarm or indication, in a manner as discussed below with reference to FIG. 9. The grease 150 may be removed manually from the tank 140, in a known manner. Thus, any one of the level determinations made in any of the embodiments of the invention is usable to control an actuatable mechanism, such as the pump 70 (FIGS. 1–4), or an audible or visible alarm or indication (FIGS. 8–9).

FIG. 5 shows in phantom a return plate 149. The return plate 149 is made of an electrically conductive material and is mounted on or adjacent the inside of the tank side wall 144. The return plate 149 is an electrically conductive member having a plate-like configuration, but could have a strip configuration or any other configuration suitable for use in measuring capacitance with the probe 146. The return plate 149 is shown mounted adjacent the inside of the tank side wall 144 for ease of mounting, but could be mounted elsewhere. The return plate 149 can substitute for the second probe 148.

To determine when grease needs to be cleaned from the separator tank 140, the capacitance is measured between the probe 146 and the return plate 149. A measured capacitance value is determined at 152. The capacitance value is used in the same manner as in the first embodiment of the invention, to determine the water level in the tank 140. The water level determination is indicative of the thickness of the grease layer 150, and can be used to determine when the accumulated grease needs to be removed from the separator tank 140. The combination of the probe 146 and return plate 149 may be used in an assembly as shown that does not include a pump for pumping grease from the tank, or in an interceptor that includes a pump.

Figure 6:
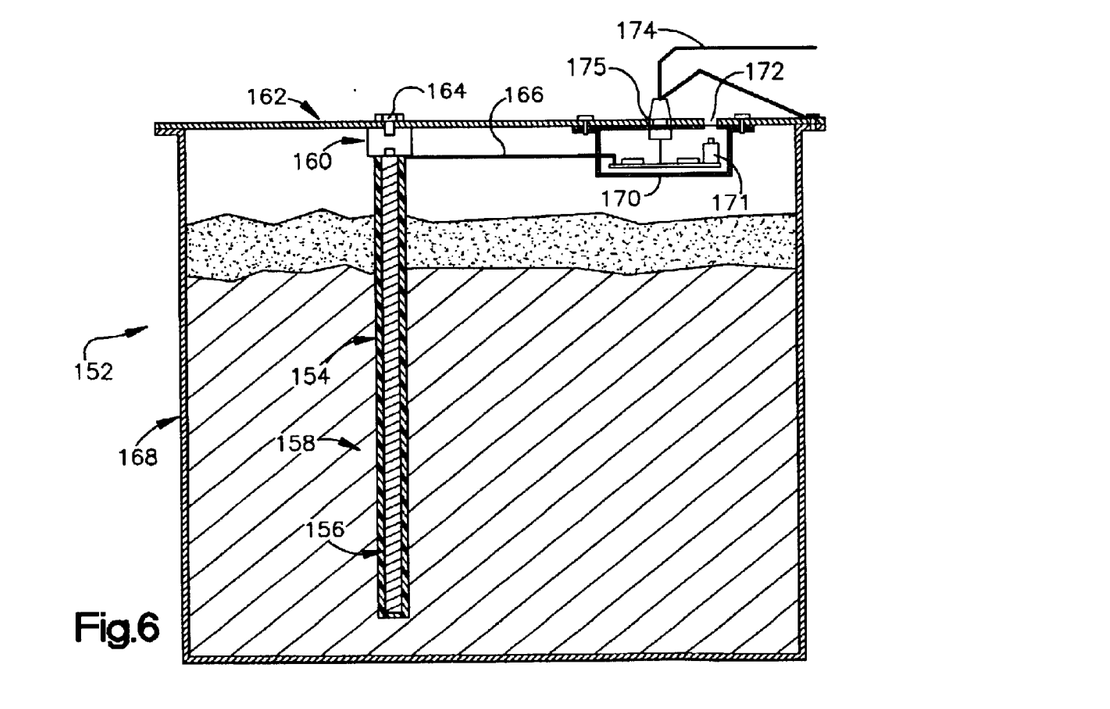
FIG. 6 is a view similar to FIG. 6 of an interceptor separator tank and sensor assembly in accordance with a further embodiment of the invention.

FIG. 6 illustrates adaptability of the present invention for retrofitting on an existing interceptor 152 that does not have a grease depth sensor of any kind present when it is manufactured. The interceptor 152 has a probe 154 of the type shown in FIG. 4, with a steel rod 156 covered by a Teflon insulator 158. An insulated bushing 160 supports the probe on the removable tank cover 162, via a mounting screw 164. A probe wire 166 runs inside the tank 168, under the top cover 162, from the steel rod 156 to an electronics package 170. The electronics package 170 is supported on the inside of the tank cover 162 in a potted form. The electronics package 170 includes an adjustment potentiometer 171 that is accessible from the outside of the tank 168 through an opening 172 in the tank cover 162. A cable 174 exits the electronics package 171 through an insulated opening 175 in the tank cover 162 and extends to the controller (not shown in FIG. 6). A ground wire 177 also extends to the conductive wall of the tank 168.

The probe 152 and electronics package 170 shown in FIG. 6, having a manually adjustable potentiometer 171, are designed for a manually calibrated system. The probe 152 and electronics package 170 may be mounted on a tank that has metal walls, as shown in FIG. 6, with capacitance measured to the tank wall. Alternatively, the probe 152 and electronics package 170 may be mounted on a tank that has plastic walls, as shown in FIG. 5, for use with a return plate or a second probe. The mounting of the probe 152 and electronics package 170 on the inside of the removable top cover 162 of the tank 168 makes it easy to retrofit the parts on an existing interceptor, with walls of either conducting or non-conducting material.

Figure 7:
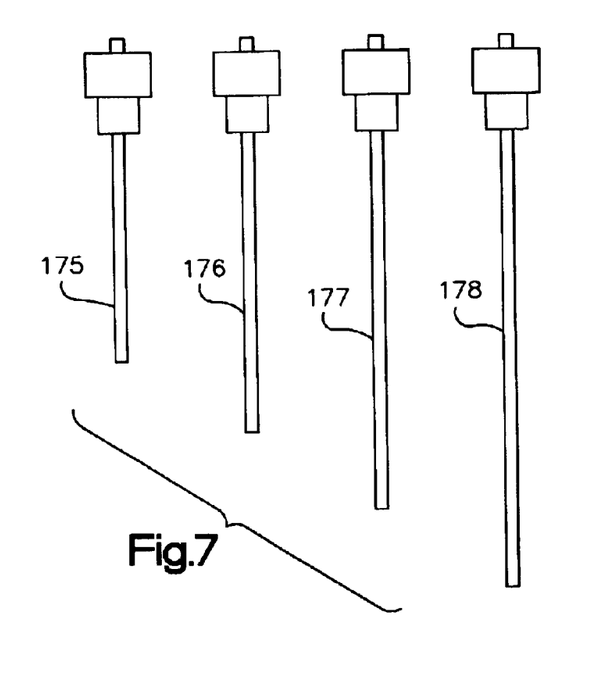
FIG. 7 is a view of a group of sensor probes of different lengths that can be used in the present invention.

FIG. 7 is a view of a group of sensor probes 175–178 of different lengths that can be used in the present invention. Existing separator tanks are of many different heights (depths). Thus, an add-on or retrofit sensor kit needs to be adapted to the particular tank with which it is used. Specifically, a probe that is used in an existing tank needs to be of an appropriate length—not too short to get below the grease-water interface, and not too long to fit in the tank. Therefore, the present invention provides probes 175–178 of different lengths. A probe of an appropriate length may be selected when purchasing the system from the manufacturer. This helps to adapt the present invention as an add-on or retrofit assembly.

The proper probe length may be determined as follows. The operator selects a probe length that extends vertically from the tank cover to a distance that is about 6" below the bottom of the water outlet pipe. For example, if the tank has a 3" diameter outlet pipe whose center is located 4" below the top of the tank, the bottom of the outlet is 5.5" below the tank cover. In that case, the user would select a tank probe 175–178 that is closest in length to 11.5" (5.5"+6").

FIG. 9 is a functional block diagram of an interceptor system 180 in accordance with a further embodiment of the invention. FIG. 9 shows several alternative ways of notifying an operator of the status (grease level) of the interceptor. These ways are usable alone or in different combinations with any of the sensor assemblies and/or tanks discussed above.

The system 180 includes a sensor assembly or probe assembly 182. The sensor assembly 182 may be any one of those described above that produces a signal indicative of the measured capacitance in the separator tank. The measured capacitance is indicative of water level and, thereby, grease level. Thus, the sensor assembly 182 provides a first output signal indicative of the amount of grease in the body of effluent.

The present invention contemplates the use of a sensor assembly 182 other than a capacitive level sensor. For example, for purposes of FIGS. 9 and 10, the sensor assembly could be (or use) a resistive sensor, a multi level float switch, or a pressure sensor. In any case, the sensor assembly 182 is one that is capable of providing a first output signal indicative of the amount of grease in the body of effluent in the separator tank.

The first output signal from the sensor assembly 182 is directed to control circuitry (a controller that may be a micro-processor, for example) indicated schematically at 184. The controller 184 processes the first output signal and actuates an actuatable mechanism (that is, takes one or more of several status-indicating actions), in response, as described below.

The controller 184 is also operable to receive manual inputs 186 from a control and alarm panel 188 (FIG. 8) that can be used in the present invention. The panel 188 is mountable on a wall or elsewhere within cable length of the interceptor tank and probe(s). For example, the panel 188 may include a calibration button 190 for initiating calibration of the interceptor and sensor assembly 182. The panel may also include a "silence alarm" button 192 for silencing an audible alarm of the system 180, for example, while the tank is being cleaned and before the system is reset.

The controller 184 can actuate an actuatable mechanism in the form of one or more local status indicators, some of which are shown on the panel (FIG. 8). The local status indicators preferably include one or more visual indicators 192. The visual indicators 192, as seen on the panel (FIG. 8) include a series of five "Level" lights or LEDs 194. The five level lights 194 indicate the amount of grease in the interceptor, from "lo" to "hi". The visual indicators 192 could be of another type, such as an analog meter. The local status indicators 192 also include an alarm light 196 that can be energized when the interceptor is in an emergency situation in which it need to be cleaned immediately.

The status indicators 192 also include an audible alarm (shown schematically at 198) that can be set to go off when a predetermined level of grease is reached. The alarm 198 is preferably a piezoelectric buzzer integral to the control panel, but could be something else. The control panel 188 may also include a switch contact to operate a larger external piezoelectric buzzer or horn or another type of audible alarm.

The local status indicators 192 in the illustrated embodiment also include a pair of "mode" lights 200, one for indicating that the system is in calibration mode, the other that the system is running.

In addition to or alternatively to actuating the visual and/or audible local status indicators, the controller 188 (FIG. 9) can telephonically provide information in an analog manner to a remote location. The system 180 includes a telephone line interface 202 with which a unique telephone number is associated for dial-up purposes. The telephone line interface is connected via a standard telephone line 204 to an external touch-tone telephone 206.

In order to check the status of the interceptor, a remote user dials the number of the telephone line interface 202, from the remote telephone 206. The user then presses one or more keys on the remote telephone 206 in a preset sequence. Upon receipt and recognition of the interrogation signal, the controller 188 responds by transmitting a second output signal over the telephone line 204, to the remote location (telephone) 206. The nature of the second output signal is responsive to the first output signal from the sensor assembly 182.

In the preferred embodiment, the second output signal is a selected tone or set of tones, transmitted over the telephone line 204, that indicate the status of the grease level in the interceptor 10. For example, the controller 188 may transmit through the telephone line interface 202 a single beep tone every two seconds, to indicate the lowest grease level. The controller 188 may transmit may a pair of beep tones every two seconds, to indicate a next higher grease level.

A group of three beep tones may be transmitted every two seconds, to indicate a middle grease level. A group of four beep tones may be transmitted every two seconds, to indicate a high grease level. A group of five beep tones may be transmitted every two seconds, to indicate a very high grease level. A continuous beep tone may be transmitted to indicate an emergency grease level in the interceptor 10.

The use of a remote telephone 206 can be by different operators to check the status of the interceptor 10. For example, the interceptor status can be checked by a service organization that services (cleans) the interceptor on which the probe assembly is mounted. Alternatively, the interceptor status can be monitored by a governmental organization, such as a Board of Health, that checks on the status of interceptors within its jurisdiction.

The actuatable mechanism that the controller 188 actuates to provide status information on the interceptor may be an RF transmitter as shown schematically at 210 (FIG. 9). The controller 188 in this case is programmed to send status information to the RF transmitter 210 for wireless transmission to a remotely located RF receiver 212. The RF receiver 212 is coupled to one or more remote visual or audible indicators 214. In this manner, the status of the interceptor 10 may be checked remotely without a telephone connection.

Figure 10:
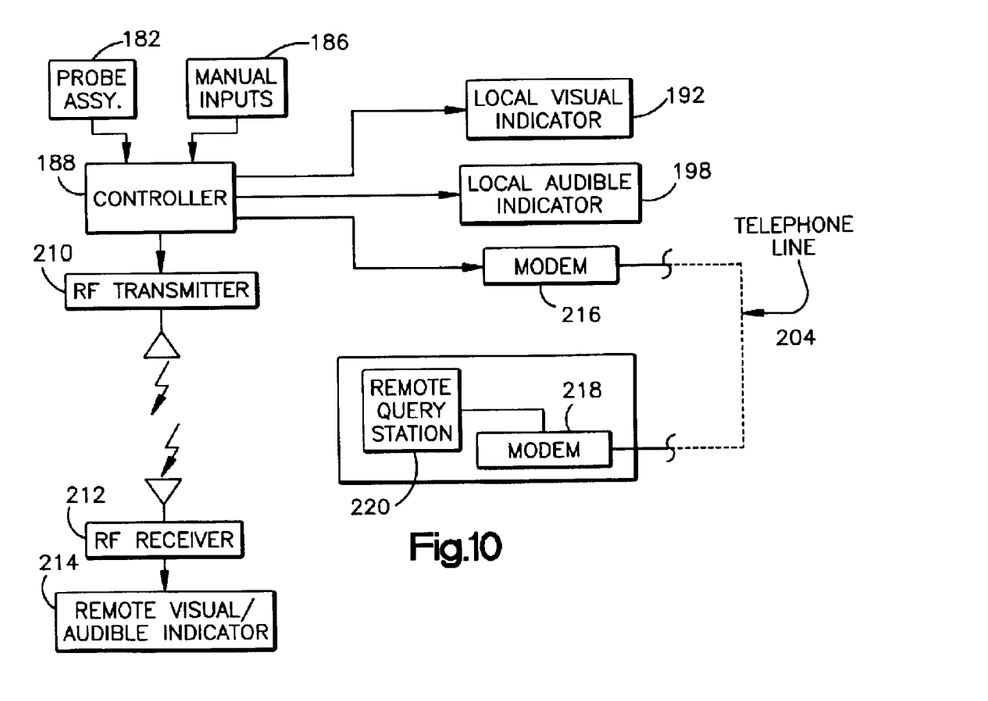
FIG. 10 is a functional block diagram similar to FIG. 9 of an interceptor system including a digital remote status check.

Alternatively, the controller 188 can telephonically provide information in a digital manner to a remote location (FIG. 10). In FIG. 10, the controller 188 is connected with the telephone line 204 via a modem 216. Another modem 218 is located at a remote query station 220. The remote query station 220 can be located anywhere a telephone line is accessible, and can be used by any person or organization, as described above.

The remote query station 220 can be a PC system that includes an external or internal modem 218. An application program on the PC system 220 would dial the telephone number assigned to the modem 216, to obtain status (grease level) information on the interceptor 10. The computer 220 may be able to dial automatically one or more telephone numbers at predetermined times. The operator may also be able to use the computer 220 to manually dial the desired phone number to check the status of the associated interceptor 10. With the telephone option, the control panel of the interceptor system 10 could also be programmed to dial a pre-set number to issue an alarm that the interceptor is in need of immediate service.

From the above description of the invention, those skilled in the art will perceive improvements, changes and modification in the invention. Such improvements, changes and modifications within the skill of the art are intended to be covered by the appended claims.

What is claimed is:

1. A sensor assembly adapted for retrofitting on a grease interceptor for removing grease for an effluent stream containing grease and water, the interceptor including a separation tank having walls and a cover defining a separation chamber, the interceptor having an effluent inlet connected with the separation tank for permitting flow of the effluent stream into the separating chamber to form a body of effluent in the separation chamber, the body of effluent having an upper surface, said sensor assembly comprising:

an actuable mechanism adapted to actuate when a thickened layer of grease in the tank reaches a predetermined level;

a first grease depth level sensor mountable on the tank cover and comprising an elongate conductive probe for extending generally vertically in the separation tank from a location above the upper surface of the body of effluent to a location below the predetermined level, at a location spaced inwardly of the walls of the separation tank;

a measuring means adapted to continuously measure the amount of water in the body of effluent by measuring the capacitance between the first grease depth level sensor and an electrically conductive member as the thickness of a layer of grease in the separation tank varies; and control means adapted to actuate said actuatable mechanism in response to said measuring means measuring a capacitance corresponding to an amount of water in said tank when said thickened layer of grease reaches said predetermined level.

2. A sensor assembly as set forth in claim 1 including an insulating bushing for supporting said first grease depth level sensor on the tank cover.

3. A sensor assembly as set forth in claim 2 further including an electronics package adapted for mounting on the tank cover, connected with said elongate conductive probe.

4. A sensor assembly as set forth in claim 1 adapted for retrofitting on a grease interceptor having electrically non-conductive walls, and including a second grease depth level sensor for extending generally vertically in the separation tank from a location above the upper surface of the body of effluent to a location below the predetermined level, at a location spaced inwardly of the walls of the separation tank and spaced apart from said first grease depth level sensor, said measuring means being adapted to continuously measure the amount of water in the body of effluent by measuring the capacitance between the first grease depth level sensor and the second grease depth level sensor as the thickness of a layer of grease in the separation tank varies.

5. A sensor assembly as set forth in claim 4 wherein said second grease depth level sensor comprises a return plate for mounting in the separation tank at a location spaced inwardly of the walls of the separation tank.

6. A sensor assembly as set forth in claim 1 wherein said measuring means comprises an R/C oscillator circuit and said control means is responsive to said oscillator circuit to control said actuatable mechanism.

7. A sensor assembly as set forth in claim 1 wherein said control means comprises a controller having a non-volatile memory and an equation of frequency versus water level that is valid for substantially all points along the length of said probe, and said controller is operative to compare the measured capacitance with values stored in its memory, and on the basis of said comparison, determine whether the amount of grease in said separation tank is sufficient to actuate said actuatable mechanism.

8. A sensor assembly as set forth in claim 1 wherein said control means comprises means to account for buildup of materials on said sensor during the lifetime of said interceptor.

9. A sensor as set forth in claim 1 further including electric circuitry for effecting manual calibration of said grease depth level sensor, including a variable resistor.

10. A sensor assembly as set forth in claim 1 further including electric circuitry for effecting automatic calibration of said grease depth level sensor, including a microprocessor.

11. A sensor assembly as set forth in claim 1 further including electric circuitry for receiving a first output signal indicative of said measured capacitance; and means for connecting said electric circuitry with a telephone line;

said electric circuitry being responsive to an interrogation signal received over the telephone line to transmit a second output signal corresponding to the first output signal, over the telephone line, to a remote location, for use in determining at the remote location the amount of grease in the body of effluent in the separation tank.

12. Apparatus for removing grease from an effluent stream containing grease and water, comprising:

a grease/water separation tank defining a separation chamber;

an effluent inlet connected with said separation tank for permitting flow of the effluent stream into said separation chamber to form a body of effluent in said separation chamber, the body of effluent having an upper surface;

an actuatable mechanism adapted to actuate when a thickened layer of grease in the tank reaches a predetermined level;

a grease depth level sensor comprising an elongated conductive probe extending generally vertically in said separation tank from a location above the upper surface of the body of effluent to a location below said predetermined level;

a measuring means adapted to continuously measure the amount of water in the body of effluent by measuring the capacitance between the probe and a wall of the separation tank as the thickness of a layer of grease in the tank varies; and control means adapted to actuate said actuatable mechanism in response to said measuring means measuring a capacitance corresponding to an amount of water in said tank when said thickened layer of grease reaches said predetermined level.

13. Apparatus as set forth in claim 12 wherein said actuatable mechanism comprises an indicator assembly including audible or visual signal devices.

14. Apparatus as set forth in claim 12 wherein said actuatable mechanism comprises electric circuitry operative to transmit a signal indicative of the amount of water in said tank to a remote location.

15. Apparatus as set forth in claim 12 wherein said actuatable mechanism comprises electric circuitry operative to transmit said signal to a remote location over a telephone line.

16. Apparatus as set forth in claim 12 wherein said actuatable mechanism comprises electric circuitry operative to transmit said signal to a remote location wirelessly.

17. An interceptor as set forth in claim 12 wherein said control means comprises a controller having a non-volatile memory and an equation of frequency versus water level that is valid for substantially all points along the length of said probe, and said controller is operative to compare the sensed capacitance with values stored in its memory, and on the basis of said comparison, determine whether the amount of grease in said separation tank is sufficient to actuate said actuatable mechanism.

18. An interceptor as set forth in claim 17 wherein said controller comprises means to account for buildup of materials on said sensor during the lifetime of said interceptor.

19. An interceptor as set forth in claim 12 further including electric circuitry for effecting manual calibration of said grease depth level sensor, including a variable resistor.

20. An interceptor as set forth in claim 12 further including electric circuitry for effecting automatic calibration of said grease depth level sensor, including a microprocessor.

21. An interceptor as set forth in claim 12 further including electric circuitry for receiving a first output signal indicative of said measured capacitance; and means for connecting said electric circuitry with a telephone line;

said electric circuitry being responsive to an interrogation signal received over the telephone line to transmit a second output signal corresponding to the first output signal, over the telephone line, to a remote location, for use in determining at the remote location the amount of grease in the body of effluent in the separation tank.

22. Apparatus as set forth in claim 21 further including at least one local status indicator connected with said electric circuitry for visually and/or audibly indicating the amount of grease in the body of effluent in the separation tank.

* * * * *